United States Patent
Chunduru Venkata et al.

(10) Patent No.: US 11,095,517 B2
(45) Date of Patent: Aug. 17, 2021

(54) METHOD AND SYSTEM FOR SECURE ZERO TOUCH DEVICE PROVISIONING

(71) Applicant: Verizon Patent and Licensing Inc., Arlington, VA (US)

(72) Inventors: Sivanaga Ravi Kumar Chunduru Venkata, Irving, TX (US); Vinod Ramalingam, Irving, TX (US); Brian E. Stephenson, Maryville, MO (US); Manish K. Srivastava, Frisco, TX (US); Ramesh Nadella, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 323 days.

(21) Appl. No.: 16/210,059

(22) Filed: Dec. 5, 2018

(65) Prior Publication Data

US 2020/0186427 A1 Jun. 11, 2020

(51) Int. Cl.
H04L 29/06 (2006.01)
H04L 12/24 (2006.01)
(Continued)

(52) U.S. Cl.
CPC .......... H04L 41/0886 (2013.01); G06F 9/455 (2013.01); H04L 9/0877 (2013.01);
(Continued)

(58) Field of Classification Search
CPC ..... H04L 63/029; H04L 63/16; H04L 63/164; H04L 41/0886; H04L 41/0806; H04L 41/0893; H04L 41/0807; H04L 9/32; H04L 9/3268; H04L 9/0877; H04L 9/08; H04L 9/3247; H04L 9/06; H04L 9/0637; H04L 9/0631; G06F 9/455; G06F 9/45558; G06F 9/455558; G06F 21/57; G06F 8/65;
(Continued)

(56) References Cited

U.S. PATENT DOCUMENTS

| | | | |
|---|---|---|---|
| 8,532,095 B2 * | 9/2013 | Mammoliti | H04L 41/0806 370/389 |
| 10,069,802 B2 * | 9/2018 | Parry | H04L 61/6022 713/162 |

(Continued)

*Primary Examiner* — Kristine L Kincaid
*Assistant Examiner* — Shaqueal D Wade (57) ABSTRACT

A customer premises device may include a memory configured to store day 0 configuration instructions, a first network interface to couple to an out-of-band orchestration and management path, a second network interface operatively coupled to a customer network, and at least one processor configured to automatically and without user input execute the day 0 configuration instructions. The at least one processor is configured to establish and maintain a secure tunnel connection with a security gateway device via the out-of-band orchestration and management path and to establish a connection with a configuration platform on the provider network via the secure tunnel connection. Orchestration instructions for configuring one or more VNFs are received from the configuration platform via the tunnel connection. The at least one processor is further configured to receive VNF management instructions via the secure tunnel connection, wherein the VNF management instructions include one of: updates, reconfigurations, or patches.

20 Claims, 7 Drawing Sheets

(51) Int. Cl.
*G06F 9/455* (2018.01)
*H04L 9/32* (2006.01)
*H04L 9/08* (2006.01)
*G06F 8/65* (2018.01)

(52) U.S. Cl.
CPC ........ *H04L 9/3268* (2013.01); *H04L 41/0806* (2013.01); *H04L 63/029* (2013.01); *H04L 63/164* (2013.01); *G06F 8/65* (2013.01); *G06F 9/45558* (2013.01); *G06F 2009/45562* (2013.01); *H04L 41/0893* (2013.01); *H04L 63/0823* (2013.01)

(58) Field of Classification Search
CPC ........... H04W 12/04; H04W 12/04071; H04W 12/04033; H04W 12/04031; H04W 12/0609
See application file for complete search history.

(56) References Cited

U.S. PATENT DOCUMENTS

| | | | |
|---|---|---|---|
| 2003/0018889 A1* | 1/2003 | Burnett | H04L 41/0809 713/153 |
| 2007/0297396 A1* | 12/2007 | Eldar | H04L 63/08 370/356 |
| 2013/0046865 A1* | 2/2013 | Liu | H04L 41/12 709/220 |
| 2014/0122674 A1* | 5/2014 | Gray | H04L 41/0806 709/222 |
| 2016/0239330 A1* | 8/2016 | McBride | H04L 41/142 |
| 2018/0165110 A1* | 6/2018 | Htay | G06F 8/65 |

* cited by examiner

METHOD AND SYSTEM FOR SECURE ZERO TOUCH DEVICE PROVISIONING

BACKGROUND

A virtual machine (VM) includes a software-based emulation of a physical computer or network device. The software is configured to execute programs or functions like a physical machine and in a manner that is optimally transparent to devices which connect thereto. Specialized types of VMs relating to computer networks are referred to as Virtual Network Functions (VNFs). VNFs include network functions that have been moved out of dedicated hardware devices into software that runs on commodity hardware. VNFs may be executed as one or more VMs on top of the hardware networking infrastructure. VNFs can be considered to be building blocks and can be connected or combined together to provide multiple capabilities required to complete a networking communication service(s). For example, VNFs can be linked together in a process known as service chaining.

Traditionally, new network services and functions have been installed manually and configured within dedicated hardware devices, such as routers, firewalls, access points, etc. VNFs, however, eliminate the need for specific hardware since new functions can be quickly deployed as one or more VMs. VNFs typically increase network scalability and agility, while enabling better use of network resources. VNFs additionally reduce power consumption and reduce the use of available physical space due to VNFs replacing physical hardware. VNFs, thus, reduce operational and capital expenditures. Examples of various virtual network functions include switches, routers, servers, tunneling gateway elements, traffic analysis functions, mobile network nodes (e.g., Home Location Register (HLR), Home Subscriber Server (HSS), Mobility Management Entity (MME), Serving General Packet Radio Services (GPRS) Support Node (SGSN), Gateway GPRS Support Node (GGSN), Packet Data Network (PDN) gateway), and security functions (e.g., firewalls, intrusion detection systems, virus scanners, spam protection).

Although implementing and incorporating VNFs has increased scalability and agility, a sticking point in traditional VNF hardware utilization lies in the initial configuration and orchestration. In general, such traditional approach requires manual installation and configuration at the customer premises, which increase expense and delays rollout.

DETAILED DESCRIPTION OF PREFERRED EMBODIMENTS

The following detailed description refers to the accompanying drawings. The same reference numbers in different drawings identify the same or similar elements.

As communication networks and services increase in size, complexity, and number of users, management of the communication networks becomes increasingly more complicated. A provider of communication services employs different techniques and strategies to manage a provider network. One strategy may include increasing use of virtualized network functions (VNFs) rather than dedicated hardware to perform particular network functions. VNFs may be deployed, for example, at customer premises or on hardware in a cloud computing center. Examples of devices that may be virtualized includes network nodes, such as, for example, routers, switches, firewalls, network address translation (NAT) devices, and/or gateways; Long Term Evolution (LTE) wireless access network nodes, such as, for example, an eNodeB, a Mobility Management Entity (MME), a Packet Data Network Gateway (PGW), a Serving Gateway (SGW), a Home Subscriber Server (HSS), etc.; Internet Protocol (IP) Multimedia Subsystem (IMS) nodes, such as a Call Session Control Function (CSCF) device or an Application Server (AS) device, etc.; and/or other types of network entities.

In contrast to dedicated specialized hardware, which may be costly, time-consuming to deploy, and/or labor-intensive to manage, network function virtualization (NFV) may enable network entities to be implemented on standardized hardware, resulting in lower deployment and/or maintenance costs, as well as higher flexibility compared to hardware implementations. However, VNFs also provide challenges. For example, VNFs may be provided and/or hosted by third-party developers and may be associated with a high operating cost. Furthermore, such developed VNFs may be difficult or costly to modify or update. Implementations described herein address these challenges.

Consistent with embodiments described herein, virtual network functions (VNFs) may be deployed using pre-configured and standardized computing platforms, sometimes referred to as "white boxes" or universal customer premises equipment (uCPE). As described herein, each uCPE may be provided with a pre-configured wireless interface that enables the uCPE device to connect to an automatic configuration server (ACS) via a wireless access network, such as an LTE network. The configuration server authenticates the device and establishes a secure, encrypted tunnel over which VNF configuration information is passed to the white box. Following configuration based on this information, the uCPE and the VNFs provided thereby may be deployed within the customer's network.

As described in detail below, in addition to initial VNF configuration, consistent embodiments may also enable persistent and secure monitoring, updating, and configuration of the deployed VNFs via the out-of-band secure tunnel. More specifically, systems described herein may be provided with a persistent or on-demand management pathway for managed network service operations, to connect to and configure the uCPE in a specialized, out-of-band manner.

Figure 1:
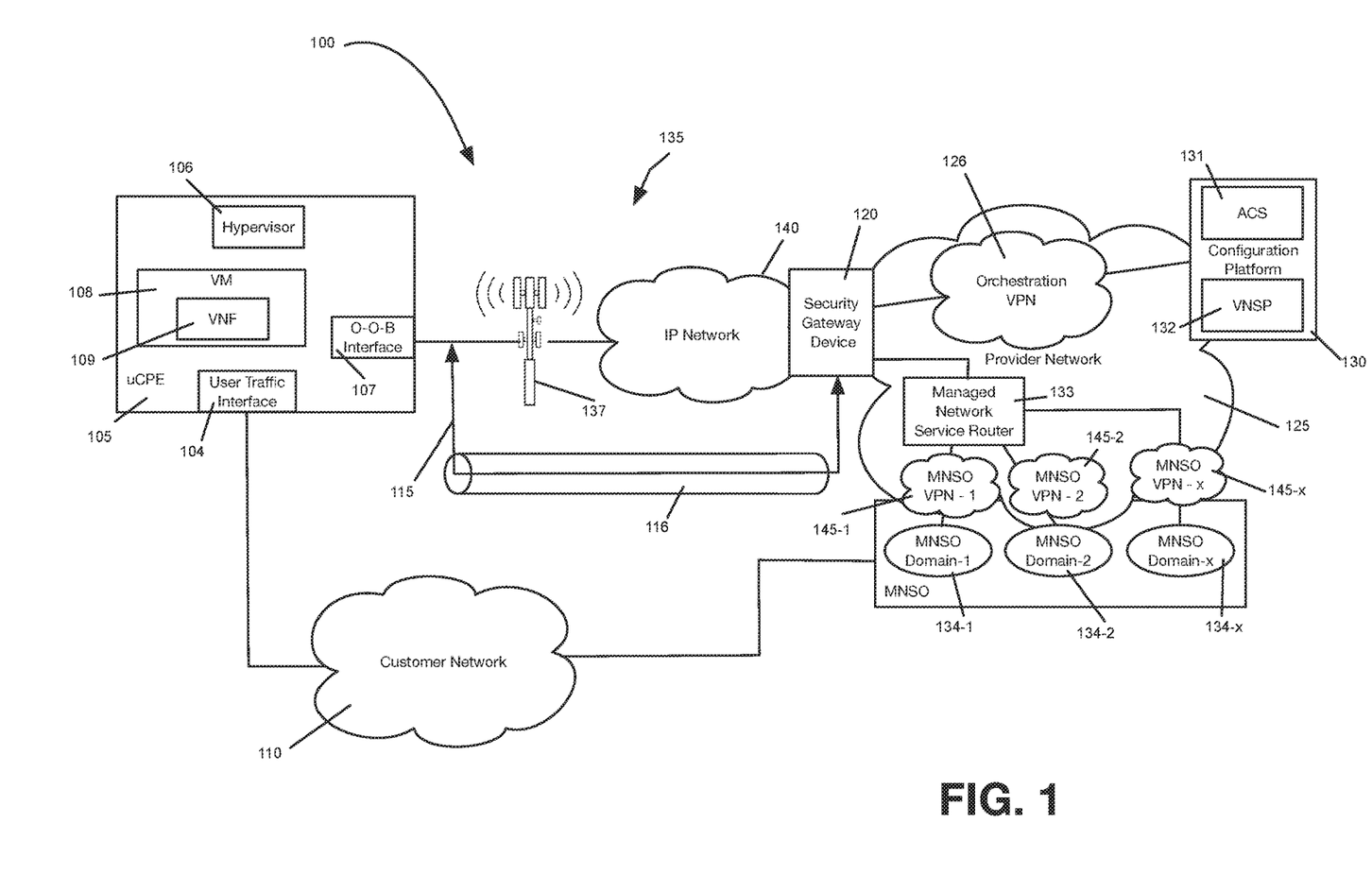
FIG. 1 is a diagram illustrating an environment according to an implementation described herein.

FIG. 1 is a diagram of an exemplary environment 100 in which systems and/or methods described herein may be implemented. As shown in FIG. 1, environment 100 may include a universal customer premises device (uCPE) 105, a customer network 110, an out-of-band network orchestration and management path 115, a security gateway device 120, a provider network 125, a configuration platform 130, a managed network service router 133, and one or more managed network service operations domains 134-1 to 134-x (collectively referred to as MNSO domains 134 or individually as MNSO domain 134).

Consistent with embodiments described herein, uCPE 105 may be initially configured as a non-provisioned white box that includes a combination of hardware and software to support day zero (day 0) bootup and provisioning at the customer premises. More specifically, uCPE 105 includes at least one user traffic network interface 104 and an out-of-band network interface 107, among other features. Consistent with embodiments described herein, user traffic network interface 104 may include one or more Ethernet or optical networking interfaces, while out-of-band network interface 107 may include a wireless access network interface (e.g., a long term evolution (LTE) interface, a 5G new radio network interface (5G-NR), etc.) that includes, for example, a subscriber identification module (SIM) or electronic SIM (eSIM), one or more antennas, etc. In other embodiments, out-of-band network interface 107 may include a different type of interface, such as an Ethernet interface, a universal serial bus interface, etc.

As described in detail below, at initial boot, uCPE 105 is configured to negotiate a secure connection with security gateway device 120 via out-of-band network interface 107 and out-of-band network orchestration path 115. For example, uCPE 105 may establish an IPSec (Internet Protocol Security) or other secure tunnel 116 between uCPE 105 and security gateway device 120. Furthermore, consistent with implementations described herein, uCPE 105 may be further configured to establish an additional secure connection with configuration platform 130, such as a websockets connection using established security credentials. The secure connection is used to identify and authenticate uCPE 105 at configuration platform 105. During subsequent provisioning or management, uCPE 105 may exchange authentication and configuration information with configuration server 130 via the out-of-band network orchestration path 115.

Once provisioned, uCPE 105 may be configured to perform the functions of a network element utilizing only a subset of the resources of the network element. For virtual network functions (VNFs), uCPE 105 can be located, for example, at a customer premises, at the edge of networks 110/115, as well as in data centers of a service provider. As shown in FIG. 1, a hypervisor 106 may configure and operate one or more virtual machines (VMs) 108 within uCPE 105. Each VM 108 may have one or more virtual network functions (VNFs) 109 provisioned thereon to provide different services. For example, VNFs 109 may be configured to function as a switch and/or router for devices in customer network 130, and may include a layer 2 and/or layer 3 network device, such as a switch, router, firewall, NAT device, gateway, and/or WiFi Access Point, and may support different types of interfaces, such as an Ethernet interface, a WiFi interface, a Multimedia over Coaxial Alliance (MoCa) interface, and/or other types of interfaces.

Customer network 110 may include a communications network, such as, local area network (LAN), or another network to enable communications among devices, such as between multiple uCPEs 105, or other network devices, as well as between end user devices, generally referred to as user equipment devices. Customer network 110 may include multiple other network elements (not shown), such as routers, gateways, switches, and other physical devices to transport traffic between physical and virtual devices.

As shown in FIG. 1, out-of-band orchestration and management path 115 may include an access network 135, such as a wireless access network 137 and a public IP network 140, such as the Internet. As described in detail below, out-of-band orchestration and management path 115 may facilitate management and configuration of uCPE 105 both upon initial installation and configuration of uCPE 105 as well as during subsequent instances following VNF orchestration.

Wireless access network 137 may establish a packet data network connection between uCPE 105 and, in particular, out-of-band network interface 107, and provider network 125. In some implementations, wireless access network 137 may include an LTE wireless network (e.g., an evolved packet core (EPC) network) based on the LTE standard specified by the 3$^{rd}$ Generation Partnership Project (3GPP). In other implementations, wireless access network 137 may include a Code Division Multiple Access (CDMA) wireless access network based on, for example, a CDMA2000 standard. For example, the CDMA wireless access network may include a CDMA enhanced High Rate Packet Data (eHRPD) network (which may provide access to an LTE wireless network).

In other implementations, wireless access network 137 may include an LTE Advanced (LTE-A) wireless network and/or any other advanced network, such as a 5G wireless network that includes functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Although not illustrated in FIG. 1, wireless access network 137 may also include one or more network devices that enable access to provider network 125 by uCPE 105, such as one or more eNodeB nodes, an MME node, an SGW node, a PGW node, an HSS node, a Policy Charging and Rules Function (PCRF) node, an Authentication, Authorization, and Accounting (AAA) node, a Multimedia Broadcast Multicast Service (MBMS) node, a Machine Type Communication (MTC) Interworking Function (IWF) node, a Service Capability Server (SCS) node, an evolved Packet Data Gateway (ePDG) node, and/or another type of network node that may be included in a wireless network.

In other implementations consistent with embodiments described herein, access network 135 may include a different (e.g., non-wireless) network or combination of networks, such as a private IP (PIP) network or VPN established between uCPE 105 and security gateway device 120. As described herein such an access network 135 is out-of-band relative to customer network 110 and may be configured to provide access to uCPE 105

Security gateway device 120 may be configured as a gateway between public IP network 140 and provider network 125 for facilitating the passage of secure traffic between uCPE 105 and configuration server 130. For example, as briefly described above, security gateway device 120 may be configured to establish IPSec tunnel 116 with out-of-band network interface 107 of uCPE 105.

In addition, consistent with some implementations described herein, security gateway device 120 may also be configured to establish and connect to one or more managed network service operations (MNSO) domains 134 via managed network service router 133. For example, managed network service router 133 may be configured to connect to MNSO domains 134 via MNSO domain VPNs 145-1 to 145-x (collectively referred to as MNSO domains 145 or individually as MNSO domain 145). In this manner, secure, out-of-band orchestration and management path 115 may be leveraged for management of uCPE 105 in addition to initial configuration and orchestration. Such functionality may be particularly useful in the event that customer network 110 is out of service or when uCPE 105 is not reachable via customer network 110 for some other reason.

As used herein, MNSO refers to managed services provided by a service provider, such as the service provider that operates provider network 125. Each MNSO domain is associated with a particular customer or group of customers. Each group may be formed based on various criteria, such as type of service, type of customer (government, private company, etc.), security level, number of customers, etc. MNSO domains 134 support the management and monitoring of various uCPEs 105 and other managed services on behalf of customers or the service provider. To accommodate efficient communications between uCPE 105 and MNSO domains 134, managed network service router 133 may be configured to maintain and/or propagate routing policies or rules relating to each MNSO domain.

Exemplary routing policies or rules may include establishing or joining border gateway protocol (BGP) communities associated with respective MNSO domains 134 and MNSO domain VPNs 145 to automatically map and route traffic between uCPE 105 and associated MNSO domains 134 via out-of-band orchestration and management path 115. For example, managed network service router 133 may be configured to create two new classes of BGP Communities for each MNSO domain 134, a first community for routes from uCPE 105 to the respective MNSO domain 134 and a second community for routes from MNSO domain 134 to uCPE 105.

As part of the initial day zero (day 0) configuration, uCPE 105 may be configured with instructions to advertise its domain community along with routes that are reachable via out-of-band network interface 107 to security gateway device 120. Security gateway device 120 is then configured to re-advertise each route along with the community to managed network service router 133. In turn, managed network service router 133 is configured to implement a BGP routing policy that advertises routes to each associated MNSO domain VPN 145 based on the community associated with the route.

For MNSO-originated traffic, each MNSO domain 134 is configured to advertise its domain BGP community to managed network service router 133 via its associated MNSO domain VPN 145. Alternatively, this can be done on managed network service router 133 by configuring managed network service router 133 to include a domain BGP community for outbound routes to security gateway device 120 based on an identification of the MNSO domain VPN 145 via which the route information was received. Security gateway device 120 then propagates each MNSO route with its associated domain community to uCPE 105. As part of the initial day zero (day 0) configuration, uCPE 105 may be configured with a routing policy that filters out all inbound routes with BGP communities that do not match its MNSO domain community.

Provider network 125 may correspond to a network managed by a provider of communication and/or VNF services or configurations. Provider network 125 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, or a combination of networks. Provider network 125 may connect to and may enable communication with wireless access network 137. For example, in some implementations, provider network 125 may include an orchestration VPN 126 established between security gateway device 120 and configuration platform 130.

Configuration platform 130 (also referred to herein as orchestration platform 130) may include a network device to authenticate, coordinate, authorize, release and/or engage network function virtualization infrastructure resources, such as resources in uCPE 105. As described herein, configuration platform 130 may be configured to receive and authenticate configuration requests. According to one implementation, configuration platform 130 may include an autonomous configuration server (ACS) 131 and a virtual network services provisioning platform (VNSP) 132.

As described herein, ACS 131 may be configured to receive and authenticate initial configuration requests from uCPE 105 via out-of-band orchestration and management path 115. In some embodiments, uCPE 105 may include a trusted platform module (TPM) that creates a trusted key pair (e.g., private and public encryption keys) during manufacture of uCPE 105. Prior to delivery, the generated public key may be transmitted along with other identification information (e.g., a uCPE identification number) to configuration platform 130 for use during device authentication and configuration.

VNSP 132 platform is configured to provide service orchestration and resource orchestration for uCPE 105. Configuration platform 130 may communicate with uCPE 105 via out-of-band orchestration and management path 115 using, for example, Simple Object Access Protocol (SOAP), Representational State Transfer (REST), Extensible Markup Language (XML), JavaScript Object Notation (JSON), Simple Network Management Protocol (SNMP), etc.

Although FIG. 1 shows environment 100 as including a single uCPE 105, a orchestration path 115, a single customer network 110, a single security gateway device 120, a single provider network 125, a single configuration platform 130, and a single managed network service router 133 for illustrative purposes, in practice, environment 100 may include multiple uCPEs 105, more than one orchestration path 115, multiple security gateway devices 120, and multiple configuration platforms 130.

In addition, although FIG. 1 shows exemplary components of environment 100, in other implementations, environment 100 may include fewer components, different components, differently arranged components, or additional functional components than depicted in FIG. 1. Additionally, or alternatively, one or more components of environment 100 may perform functions described as being performed by one or more other components of environment 100.

Figure 2:
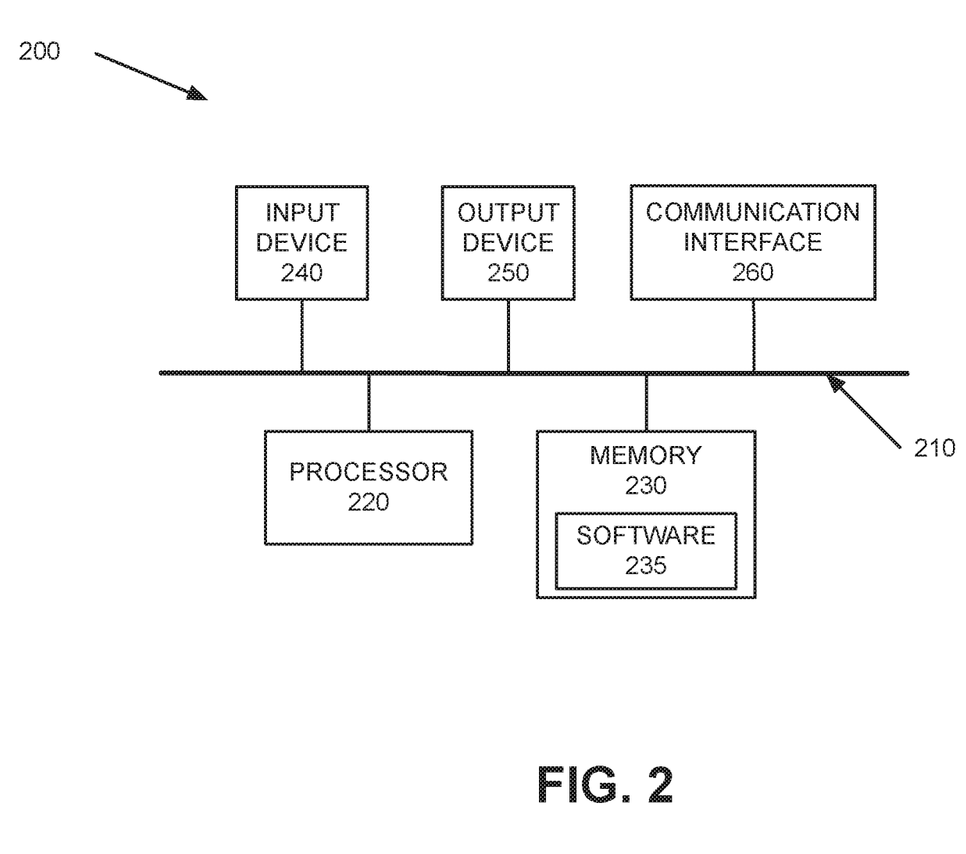
FIG. 2 is a diagram illustrating exemplary components of a device that may be included in a device or system of FIG. 1.

FIG. 2 is a diagram illustrating exemplary components of device 200 according to an implementation described herein. uCPE 105, security gateway device 120, configuration platform 130, and managed network service router 133 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. For example, processor 220 may include one or more Central Processing Units (CPUs) and/or one or more Graphics Processing Units (GPU). In other embodiments, processor 220 may include an application-specific integrated circuit (ASIC), a field-programmable gate array (FPGA), and/or another type of integrated circuit or processing logic. Processor 220 may control operation of device 200 and its components.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200 and/or to collect information from the environment using one or more sensors. Input device 240 may include, for example, buttons (e.g., a keyboard, keys of a keypad, control buttons, etc.), a mouse, a pen, a joystick, a tracking pad, a stylus, a remote control, a microphone or another audio capture device, an image and/or video capture device (e.g., a camera), a touch-screen display, a light sensor, a gyroscope, an accelerometer, a proximity sensor, a temperature sensor, a barometer, a compass, a health sensor (e.g., pulse rate monitor, etc.), and/or another type of input device.

Output device 250 may output information to an operator of device 200 and/or to control device 200 and/or the environment using one or more actuators. Output device 250 may include a display, a printer, a speaker, an illumination source (e.g., a camera flash), an actuator to cause device 200 to vibrate, a motor to cause part of device 200 to move, a lock device, and/or another type of output device. For example, device 200 may include a liquid-crystal display (LCD), a light emitting diode (LED) display, an organic LED (OLED) display, an electrophoretic (e.g., electronic ink) display, and/or another type of display device for displaying content to a user.

Consistent with implementations described herein, device 200 may be managed remotely and may not include input device 240 or output device 250. In other words, device 200 may be "headless" and may not include a keyboard, display, etc.

Communication interface 260 may include one or more transceivers that enable device 200 to communicate with other devices and/or systems via wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to an antenna for transmitting and receiving RF signals. For example, if device 200 is included in uCPE 105, communication interface 260 may include an antenna assembly that includes one or more antennas to transmit and/or receive RF signals via wireless access network 137.

Communication interface 260 may include a logical component that includes input and/or output ports, input and/or output systems, and/or other input and output components that facilitate the transmission of data to other devices. For example, communication interface 260 may include one or more network interface elements for wired communications and/or a wireless network interface (e.g., a WiFi) card for wireless communications. Communication interface 260 may also include a universal serial bus (USB) port for communications over a cable, a Bluetooth™ wireless interface or an interface for another type of short range (e.g., less than 100 meters) wireless communication method, a radio-frequency identification (RFID) interface, a near-field communications (NFC) wireless interface, a Global Positioning System (GPS) receiver to obtain location information from GPS satellites, an optical transceiver, and/or any other type of interface that converts data from one form to another form. As described briefly above, if device 200 is included in uCPE 105, communication interface 260 may include one or more network interfaces for communicating or facilitating customer network 110.

As will be described in detail below, device 200 may perform certain operations relating to uCPE configuration and management. Device 200 may perform these operations in response to processor 220 executing software instructions 235 contained in a computer-readable medium, such as memory 230. A computer-readable medium may be defined as a non-transitory memory device. A memory device may be implemented within a single physical memory device or spread across multiple physical memory devices. Software instructions 235 may be read into memory 230 from another computer-readable medium or from another device. When executed by processor 220, software instructions 235 contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
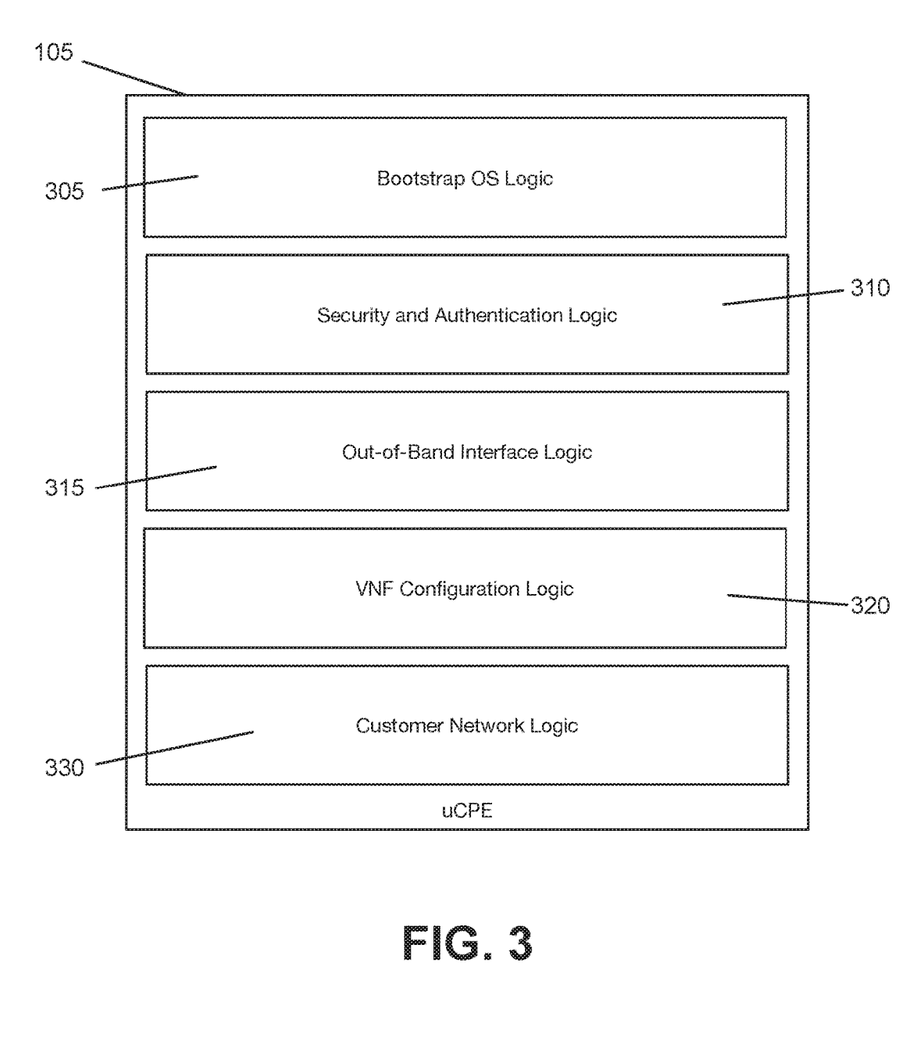
FIG. 3 is a diagram illustrating exemplary functional components of the uCPE of FIG. 1.

FIG. 3 is a diagram illustrating exemplary functional components of uCPE 105 consistent with embodiments described herein. The functional components of uCPE 105 may be implemented, for example, via processor 220 (or more than one processor 220) executing instructions from memory 230. Alternatively, some or all of the functional components included in uCPE 105 may be implemented via hard-wired or dedicated circuitry.

As shown in FIG. 3, uCPE 105 includes bootstrap OS logic 305, security and authentication logic 310, out-of-band interface logic 315, VNF configuration logic 320, and customer network logic 330.

Consistent with embodiments described herein, bootstrap OS logic 305 may include software or a combination of hardware and software for initiating configuration of uCPE 105. For example, bootstrap OS logic 305 may include an operating system having an initial configuration that includes a uCPE identifier unique to the particular uCPE 105. The operating system may be configured to initiate communication with security gateway device 120 via out-of-band network orchestration path 155 using security and authentication logic 310 and out-of-band interface logic 315.

Security and authentication logic 310 includes software or a combination of hardware and software for supporting secure communications between uCPE 105 and security gateway device 120 and between uCPE 105 and configuration platform 130. For example, in some implementations, security and authentication logic 310 may include a trusted platform module (TPM) for generating a set of private and public encryption keys. During initial manufacture, security and authentication logic 310 may generate the key pair and may export the public key to configuration platform 130 for use during uCPE authentication, as described below.

In further accordance with embodiments described herein, security and authentication logic 310 may be configured, upon initial device boot up, to generate a Certificate Signing Request (CSR) that includes at least the uCPE identifier and the public key and is encrypted using the private key generated by the TPM during manufacture/initial configuration. Upon connection to out-of-band orchestration and management path (e.g., via wireless access network 137), security and authentication logic 310 may transmit the CSR to configuration platform 130 for signing. In one embodiment, the network location of configuration platform 130 is determined via a domain name service (DNS) lookup for a particular URL. This allows for identification of a most appropriately located/available configuration platform 130, among multiple platforms.

Upon receipt of the CSR, configuration platform 130 may decrypt the CSR using the earlier provided public key and verify that the uCPE identifier and public key match information in a device inventory list maintained by configuration platform 130. If the information matches, configuration platform 130 signs and returns the signed certificate back to uCPE 105. Upon receipt of the signed certificate, security and authentication logic 310 may establish a secure bidirectional connection with configuration platform 130 for receiving configuration information relating to the particular uCPE 105.

In another exemplary implementation, security and authentication logic 310 may be configured to perform proxying or reverse network address translation for other components in uCPE 105. Accordingly, outward connection requests to configuration platform 130 by, for example, a VM or VNF running on uCPE 105 will be internally directed to a local network address and port combination and the actual network address(es) of configuration platform 130 are hidden from those components. In this manner, a security breach of the VMs and VNFs on uCPE does not expose the elements of configuration platform 130.

Out-of-band interface logic 315 includes out-of-band network interface 107 described above and is configured to enable uCPE 105 to logically connect to security gateway device 120 via out-of-band network orchestration path 115, which includes an access network 135. As described above, in some implementations, access network 135 may include a wireless access network 137, such as an LTE or 5G wireless network. In such an implementation, during initial startup, bootstrap OS logic 305 may be configured to communicate with security gateway device 120 based on pre-configured settings without input from a user other than initially powering on of uCPE 105. Exemplary pre-configured interface settings may include, for example, a network address (e.g., uniform resource locator (URL), IP address, etc.) of security gateway device 120, and possibly gateway authentication information, such as a secure passphrase for creating secure tunnel 116 between uCPE 105 and security gateway device 120. In one embodiment, the network location of security gateway device 120 is determined via a DNS lookup for a particular URL. This allows for identification of a most appropriately located/available security gateway device 120 where multiple gateway devices are provided.

As described above, the secure tunnel between uCPE 105 and security gateway device 120 includes an IPSec tunnel initiated via Internet Key Exchange (IKE), such as a tunnel that supports IKE V2 and that initially generates an IKE security association (SA) between the uCPE 105 and security gateway device 120 using a pre-shared key. Using the IKE SA, a child SA is created that protects data from the security gateway 120 to uCPE 105. In exemplary embodiments, out-of-band interface logic 315 further supports one or more Diffie-Hellman (DH) groups for establishing an additional shared secret for setting up the IPSec tunnel. A variety of encryption algorithms may be supported, such as the Advanced Encryption Standard (AES), the secure hash algorithm (SHA), or AES extended cipher-block-chaining (XCBC). Depending on the implementation, additional tunnel-related features may be supported, such as NAT detection, and UDP tunneling of ESP.

Consistent with implementations described herein, the secure tunnel established between uCPE 105 and security gateway device 120 may be either perpetually maintained during a lifetime of uCPE 105, such that out-of-band communications may be performed securely at any time or may be initiated or triggered periodically, or on an as-needed basis, by either uCPE 105 or security gateway device 120. For example, uCPE 105 may be configured to tear down an initially established tunnel after VNF configuration and to perform periodic check-ins by recreating the tunnel on a periodic basis. Alternatively, the secure tunnel may be reestablished in the event of what is referred to as "interesting traffic" directed, either outwardly toward security gateway 120 at uCPE 105 or inwardly toward CPE 105 at security gateway 120. Since all traffic on out-of-band orchestration and management path 115 should be considered interesting, any traffic destined can trigger tunnel reestablishment in the manner described above VNF configuration logic 320 may include software or a combination of software and hardware for receiving and executing VNF orchestration based on instructions or configuration information received from configuration platform 130. For example, as described above, based on a customer request or order, or based on an established customer profile, and following identification and authentication of uCPE 105, configuration platform 130 may transmit VNF configuration information, to uCPE 105, that corresponds to the ordered or selected VNF components. In response, VNF configuration logic 320 may create any necessary components, such as VMs 108, hypervisor 106, etc. and provision the defined VNF(s) 109 on uCPE 105.

Customer network logic 330 includes user traffic network interface 104 and any processing and hardware elements for implementing the provisioned VNF(s) 109. For example, customer network logic 330 may include hardware and software components that are generally referred to as network functions virtualization infrastructure (NFVI) for supporting and implementing requested VNFs 109.

Although FIG. 3 shows exemplary components of uCPE 105, in other implementations, uCPE 105 may include fewer components, different components, additional components, or differently arranged components than depicted in FIG. 3. Additionally, or alternatively, one or more components of uCPE 105 may perform one or more tasks described as being performed by one or more other components of uCPE 105.

Figure 4:
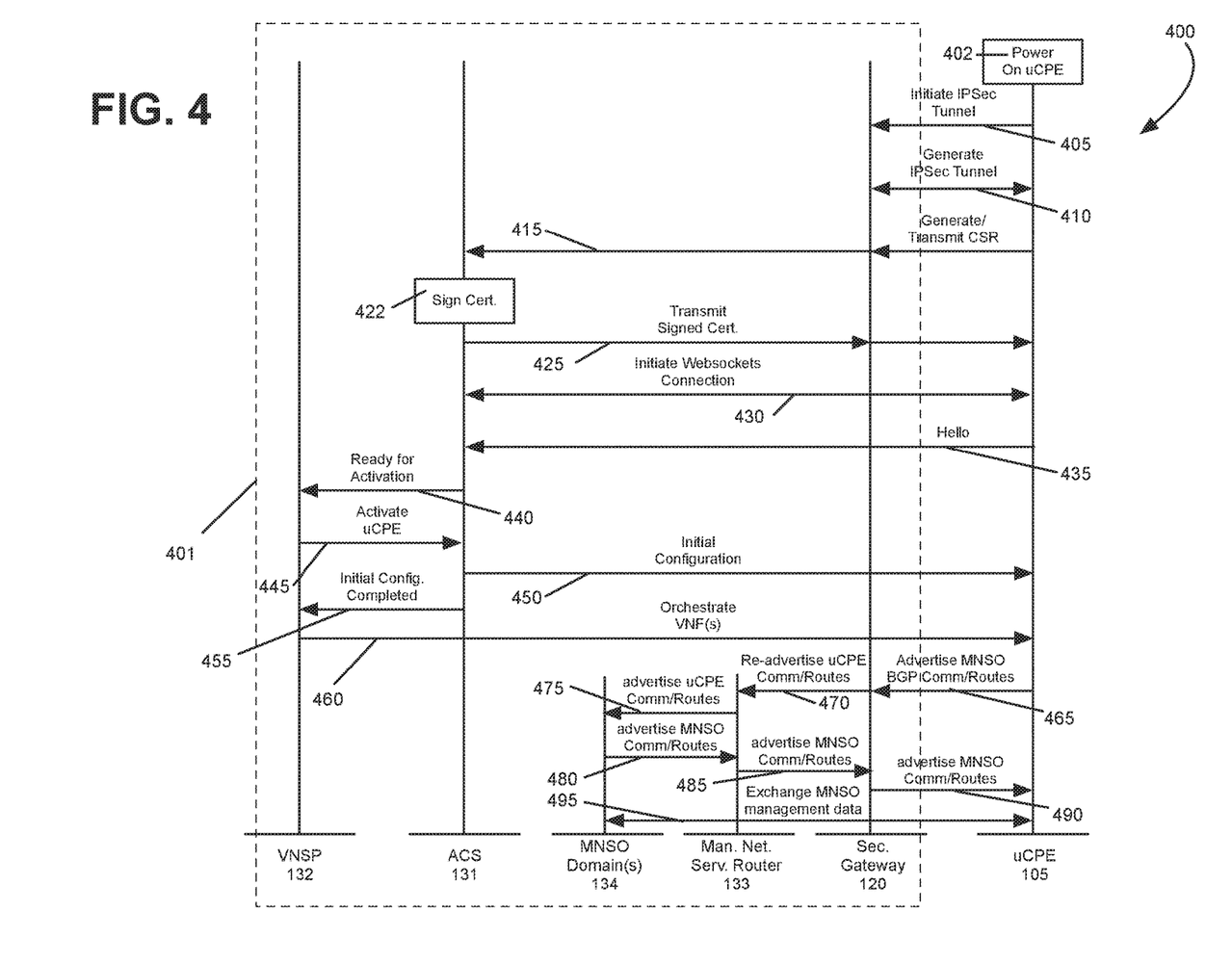
FIG. 4 is an exemplary signal flow diagram illustrating processing associated with in initial configuration of the uCPE of FIG. 1 consistent with embodiments described herein.

FIG. 4 is an exemplary signal flow diagram 400 illustrating processing associated with in initial configuration of uCPE 105 consistent with embodiments described above. As shown, FIG. 4 depicts processing performed by entities within provider network 125 as within dashed line 401 and processing performed by uCPE 105 as outside of dashed line 401.

Processing begins when uCPE 105 is initially powered on (402), which may be also referred to as a day 0 boot. During that initial boot, uCPE 105 attaches to wireless network 137 and initiates communication with security gateway device 120 (signal 405) to create a secure tunnel. For example, as described above, uCPE 105 may initiate IKE to generate an IPSec tunnel between uCPE 105 and security gateway device 120 via out-of-band orchestration and management path 115. In response to the request, security gateway device 120 and uCPE 105 negotiate and establish a secure tunnel therebetween (signal 410).

Following the IPSec tunnel creation between uCPE 105 and security gateway device 120, uCPE 105 may transmit a CSR to ACS 131 (signal 415). For example, as described above, uCPE 105 may request that ACS 131 sign a certificate encrypted based on a public/private key pair generated by TPM of uCPE during initial configuration. Assuming that successful authentication of the CSR is performed, ACS 131 signs the certificate (422) and returns the signed certificate back to uCPE 105 via the established IPSec tunnel (signal 425). Using the signed certificate, uCPE 105 and ACS 131 then establish a secure websockets connection therebetween for supporting delivery of VNF configuration information, as described below (signal 430).

Once both the IPSec tunnel between the uCPE 105 and security gateway device 120 and the websockets connection between uCPE 105 and ACS 131 have been established, configuration of uCPE 105 may commence. Such configuration may begin with the uCPE 105 transmitting a Hello message to ACS 131 (signal 435). In general, a suitable Hello message includes information that identifies uCPE 105 and its bootstrap configuration. The following is an exemplary Hello message payload:

```
{
    "deviceId": "0123456789abcdef",
    "OSvendor":"Adva",
    "EventType":"Bootstrap"
    "swVersions": {
```

-continued

```
    "linuxVersion": "Ubuntu_16.04.1_LTS",
    "openStackComputeVersion": "17.1.x",
    "openStackControllerVersion": "17.1. y",
    "connectorVersion": "17.1.z"
    }
}
```

The "deviceId" value refers to the uCPE identifier associated with uCPE 105 and known to ACS 131. The "OSVendor" value refers to a vendor of the operating system executing the VNF configuration logic 320. The "EventType" value indicates the trigger for the Hello message. Consistent with implementations described herein, in addition to bootstrap day 0, Hello messages may be sent for other reasons, such as uCPE reboot, retransmission, or recreation of either the IPSec tunnel or the websockets connection. In some embodiments, the Hello message, and other uCPE configuration related messaging may be configured as representational state transfer (REST) messages transmitted via HTTPS using a preconfigured port (e.g., 443). As briefly described above, a network location of ACS 131 may be known to uCPE 105 during initial pre-delivery configuration and may include a URL or a known network (e.g., IP) address.

In response to the Hello message and assuming successful authentication of the Hello message (e.g., that the deviceId is known, etc.), ACS 131 transmits a request to VNSP 132 to ascertain whether uCPE 105 is ready for activation (signal 440). In other words, ACS 131 determines whether a customer associated with uCPE 105 has selected and/or configured one or more VNFs for provisioning on uCPE 105. Assuming that such a configuration is present, VNSP 132 returns an activate uCPE command to ACS 131 (signal 445) and ACS 131 transmits initial uCPE configuration files to uCPE 105 (signal 450). In some implementations, the configuration file transfer is performed via a REST API supported by uCPE 105.

Based on the received configuration files, uCPE 105 performs its initial configuration in preparation of VNF orchestration. For example, uCPE 105 may set up a defined hypervisor and other VNF-related components on uCPE 105. ACS 131 then notifies VNSP 132 that initial configuration of uCPE 105 has been completed (signal 455). In response, VNSP 132 transmits VNF orchestration files and instructions to uCPE 105 based on the pre-defined customer configuration (signal 460). In some implementations, the VNF orchestration file transfer is also performed via a suitable REST API supported by uCPE 105. Based on these instructions, uCPE 105 orchestrates and provisions the one or more VNFs and connects the one or more VNFs to customer network 110.

Once one or more VNFs have been provisioned, out-of-band access to uCPE 105 for MNSO domains 134 are provided. In particular, as shown in FIG. 4, uCPE 105 initially advertises its domain community and associated routes to security gateway device 120 (signal 465). Security gateway device 120 the re-advertises this information to managed network service router 133 (signal 470), which in turn advertises uCPE routes to the MNSO domains 134 via the MSNO domain VPNs 145 established in provider network 125 (signal 475). At the same time, for MNSO-originating traffic, the MSNO domains 134 are configured to advertise domain BGP communities to managed network service router 133 via its associated MNSO domain VPN 145 (signal 480). Managed network service router 133 propagates this community information to security gateway device 120 (signal 485), which then forwards the information to uCPE 105 (signal 490). Once all MNSO-related communities and routes have been propagated between uCPE 105 and MNSO domains 134, maintenance and configuration information may be efficiently exchanged via out-of-band orchestration and management path 115 (signal 495).

Figure 5A:
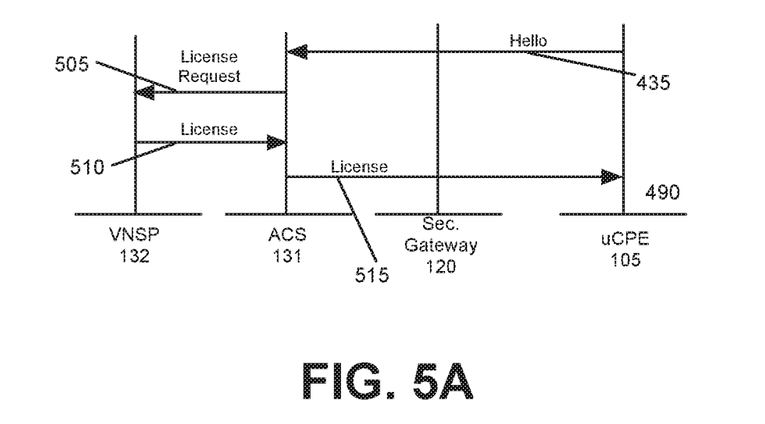
FIG. 5A is an exemplary signal flow diagram illustrating a license acquisition procedure.
Figure 5B:
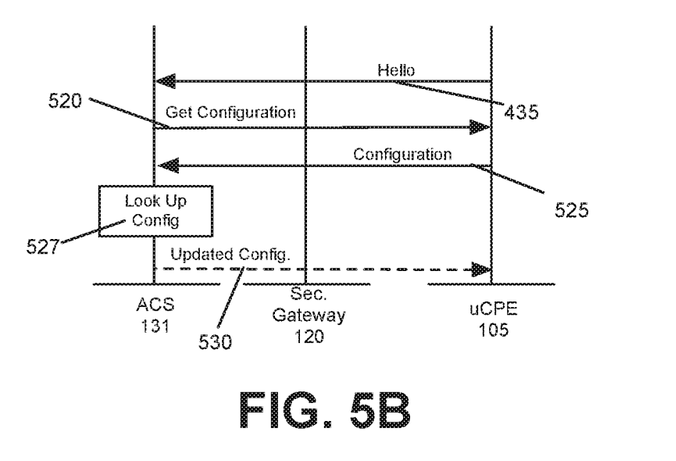
FIG. 5B is an exemplary signal flow diagram illustrating a configuration reconciliation procedure.
Figure 5C:
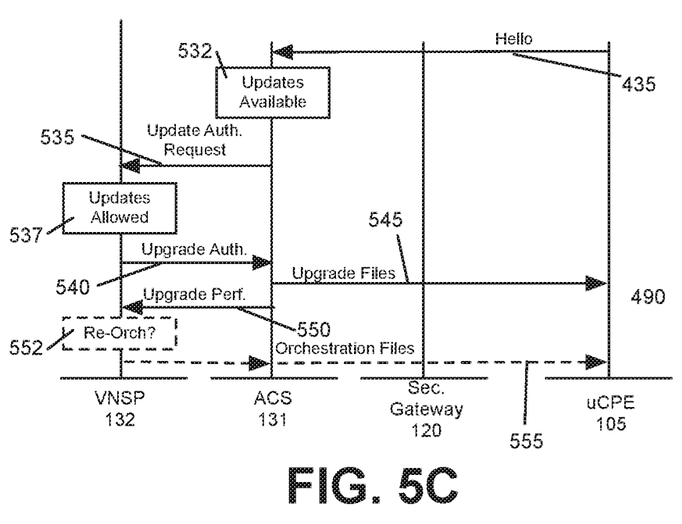
FIG. 5C is an exemplary signal flow diagram illustrating a uCPE-initiated software reconciliation procedure.
Figure 5D:
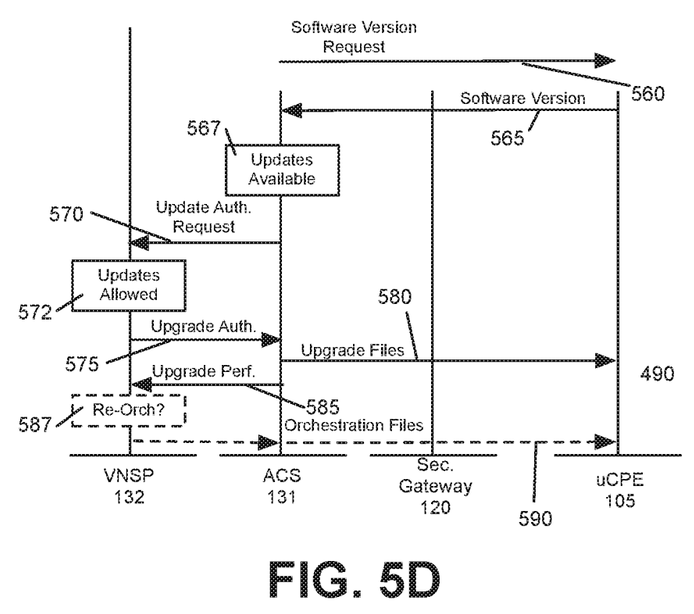
FIG. 5D is an exemplary signal flow diagram illustrating a ACS-initiated software reconciliation procedure.

FIGS. 5A-5D are exemplary signal flow diagrams 400 illustrating additional processing responsive to a received Hello message, as described above in relation to FIG. 4. associated with in initial configuration of uCPE 105 consistent with embodiments described above. FIG. 5A depicts a license acquisition procedure, FIG. 5B depicts a configuration reconciliation procedure, FIG. 5C depicts a uCPE-initiated software reconciliation procedure, and FIG. 5D depicts an ACS-initiated software upgrade procedure.

Referring to FIG. 5A, processing begins when uCPE 105 transmits a Hello message (signal 435) to ACS 131 as described above in FIG. 4. The transmitted Hello message includes the uCPE identifier and other information regarding the components and capabilities of uCPE 105, such as OS software version, etc. In response to the Hello message, ACS 131 transmits a license request message (signal 505) to VNSP 132 and, in response VNSP 132 determines whether a customer license is available for uCPE 105. Assuming that a license is available, VNSP transmits a license file to ACS 131 (signal 510), which in turn transfers the license file to uCPE 105 (signal 515). In some implementations, the license file transfer is performed via a suitable REST API supported by uCPE 105.

Referring to FIG. 5B, processing again begins when uCPE 105 transmits the Hello message (signal 435) to ACS 131 as described above in FIG. 4. In response, ACS 131 transmits a get configuration message (signal 520) to uCPE 105. In response, uCPE 105 returns a configuration message (signal 525) to ACS 131 that includes information regarding the current configuration of uCPE 105, including software versions, VNF configurations, etc. In response, ACS 131 compares (527) the received configuration information to a maintained database of configuration information. If there are updates, modifications, or patches to the configuration of uCPE 105, the updated configuration files are transmitted to uCPE 105 (signal 530).

Consistent with embodiments described herein, uCPE 105 may be configured to update in a manner consistent with a customer's ecosystem. For example, updates or restorations of uCPE 105 may be made in view of the active or backup role currently applied to the device, such that customer services are not unnecessarily impacted. As an example, assume that a customer has two uCPEs 105 operating onto which load balancer VNFs have been provisioned, one as active and one as a backup. In the event that updates are to be applied, each uCPE 105 may determine which device is active and to switch between the active and backup device as necessary to perform the updates without downtime to the VNF.

Referring to FIG. 5C, processing again begins when uCPE 105 transmits the Hello message (signal 435) to ACS 131 as described above in FIG. 4. In response, ACS 131 determines (532) whether the versions of software (e.g., OS, interfaces, VNF platform, etc.) currently executing on uCPE 105 have updates or upgrades that need to be installed. For example, a security update or version upgrade may be available for one or more of the software components. In some implementations, ACS 131 maintains or accesses a database of updated software version for performing the comparison. In other implementations, ACS 131 may initiate a query to respective vendors on-demand based on the software versions indicated in the received Hello message.

Assuming that one or more software updates/upgrades are available, ACS 131 may transmit an update authorization request message (signal 535) to VNSP 132 requesting permission to perform the update. In response, VNSP 132 may determine (537) whether uCPE 105 may be updated, based on the tasks being performed, active or backup status, etc. VNSP 132 then sends an upgrade authorized message (signal 540) to ACS 131. In response, ACS transmits (signal 545) the software update/upgrade files to uCPE 105 and notifies VNSP 132 that the update/upgrade was performed (signal 550). Depending on the type of update performed, VNSP may determine (552) that one or more VNFs on uCPE 105 need to be re-orchestrated. If so, VNSP may forward orchestration information (signal 555) to uCPE 105 similar to orchestration described above in relation to initial VNF orchestration.

Referring to FIG. 5D, processing begins with ACS 131 sending a software version request message (signal 560) to uCPE 105. Consistent with embodiments described herein, uCPE 105 may be provided with a REST API for handling software version requests. As described above, in some implementations, in the event that the initial IPSec tunnel has collapsed or been torn down, security gateway device 120 may initiate IPSec tunnel reestablishment upon receipt of the software version request message. In response, uCPE 105 transmits a software version message (signal 565) that includes indications of the various software versions running on uCPE 105, similar to those provided in the Hello message described above. In some instances, software version message may include the Hello message.

Upon receipt of the software version information, ACS 131 determines (567) whether the versions of software (e.g., OS, interfaces, VNF platform, etc.) currently executing on uCPE 105 have updates or upgrades that need to be installed. Assuming that one or more software updates/upgrades are available, ACS 131 may transmit an update request message (signal 570) to VNSP 132 requesting permission to perform the update. In response, VNSP 132 may determine (572) whether uCPE 105 may be updated, based on the tasks being performed, active or backup status, etc. VNSP 132 then sends an upgrade authorized message (signal 575) to ACS 131. In response, ACS 131 transmits (signal 580) the software update/upgrade files to uCPE 105 and notifies VNSP 132 that the update/upgrade was performed (signal 585). Depending on the type of update performed, VNSP 132 may determine (587) that one or more VNFs on uCPE 105 need to be re-orchestrated. If so, VNSP 132 may forward orchestration information (signal 590) to uCPE 105 similar to orchestration described above in relation to initial VNF orchestration.

Figure 6:
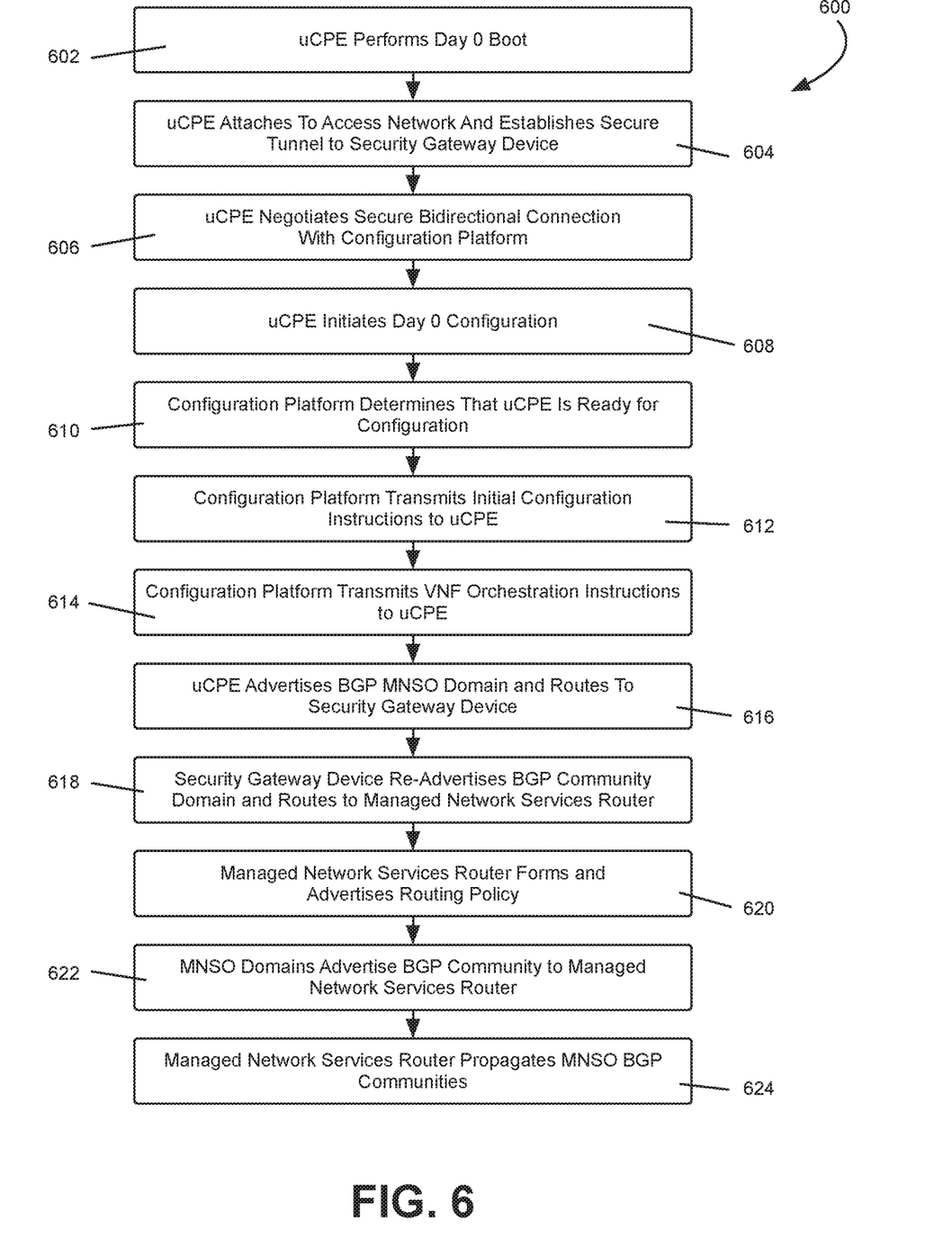
FIG. 6 is a flow diagram illustrating a method of performing zero touch provisioning and management of a uCPE consistent with embodiments described herein.

FIG. 6 is a flow diagram 600 illustrating a method of performing zero touch provisioning and management of a uCPE consistent with embodiments described herein. Initially, an unactivated and non-provisioned uCPE 105 is deployed to a customer location and is powered on (referred to the day 0 boot) (block 602). During the day 0 boot, uCPE 105 attaches to out-of-band orchestration and management path 115 (e.g., wireless access network 137) and establishes a secure tunnel with security gateway device 120 (block 604). For example, as described above, security and authentication logic 310 in uCPE 105 may negotiate an IPSec tunnel with security gateway device 120 using IKE and based on preconfigured authentication information.

Once connected to security gateway device 120 via the secure tunnel, uCPE 105 negotiates a secure bidirectional connection (e.g., a websockets connection) with configuration platform 130 (block 606). For example, security and authentication logic 310 in uCPE 105 may request and receive a signed certificate in the manner described above and may establish a websockets connection using the signed certificate. Using the established websockets connection and via the secure tunnel, uCPE 105 next initiates its day 0 configuration (block 608). For example, as described above, uCPE 105 may transmit a REST Hello message to configuration platform 130 that includes identification information as well as software vendor and version information. In response, configuration platform 130 determines whether uCPE 105 is ready for activation (i.e., one or more VNFs or other services have been ordered or configured by the customer, etc.) (block 610).

If the uCPE 105 is ready for activation, configuration platform 130 transmits and uCPE 105 receives the initial configuration instructions (block 612). Following initial configuration, uCPE 105 receives VNF orchestration instructions from configuration platform 130 (block 614).

Regarding post-orchestration management of uCPE 105, at block 616, uCPE 105 advertises its BGP MNSO domain community and routes to security gateway device 120. In response, security gateway device 120 re-advertises the received community and route information to managed network service router 133 (block 618), which then formulates an appropriate routing policy for reaching uCPE 105 and advertises the routing policy to MNSO domains 134 based on the community associated with the route (block 620). Each MNSO domain 134 advertises its BGP community to managed network service router 133 (block 622). The MNSO domain BGP communities are then propagated to security gateway device 120 and uCPE 105 for use in filter content from MNSO domains to which uCPE 105 does not belong (block 624).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of signals, messages, and/or blocks have been described with respect to FIGS. 4, 5A-5C and 6, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information by individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a customer equipment device, the method comprising:
    establishing a secure tunnel connection with a security gateway device via at least one out-of-band network, wherein the security gateway device is operatively coupled to a provider network;
    automatically and without user input establishing a connection with a configuration platform on the provider network via the secure tunnel connection;
    receiving orchestration instructions for configuring one or more virtual network functions (VNFs) from the configuration platform, wherein the orchestrations instructions are based on one or more customer configuration requests;
    automatically orchestrating the one or more VNFs based on the received orchestration instructions, wherein the one or more VNFs are configured to operate on a customer network that is different than the at least one out-of-band network;

advertising management domain routing information to the security gateway device via the secure tunnel connection; and receiving VNF management instructions from the security gateway device and via the secure tunnel connection based on the advertised management routing information, wherein the VNF management instructions include one of: updates, reconfigurations, or patches.

2. The method of claim 1, wherein establishing the secure tunnel connection comprises:

retrieving initial configuration settings from a memory, wherein the initial configuration settings include at least one of a uniform resource locator (URL) or a network address associated with the security gateway device and a pre-shared key; and establishing an Internet Protocol Security (IPSec) tunnel with the security gateway device based on the initial configuration settings.

3. The method of claim 2, wherein the IPSec tunnel is persistently maintained or periodically recreated following orchestration of the one or more VNFs to receive the management instructions.

4. The method of claim 2, wherein the IPSec tunnel is recreated on demand by the customer equipment device upon receipt of management instructions for the customer equipment device at the security gateway device.

5. The method of claim 1, wherein the at least one out-of-band network comprises a wireless network, and wherein the customer equipment device is configured to attach to the wireless network prior to establishing the secure tunnel connection.

6. The method of claim 5, wherein the at least one out-of-band network further comprises a public IP network between the wireless network and the security gateway device.

7. The method of claim 1, further comprising:

generating, by a trusted platform module on the customer equipment device and prior to delivery of the customer equipment device to the customer, a key pair for authenticating and encrypting the customer equipment device during configuration.

8. The method of claim 7, wherein establishing the connection with the configuration platform further comprises:

automatically generating a certificate signing request (CSR) based on the key pair;

transmitting the CSR to the configuration platform;

receiving a signed certificate from the configuration platform; and establishing the connection with configuration platform based on the signed certificate.

9. The method of claim 8, wherein the connection comprises a websockets connection.

10. The method of claim 1, wherein the one or more VNFs include at least one of: a Long Term Evolution (LTE) wireless network node, a router, a switch, a firewall, a gateway, or a reconfigurable optical add-drop multiplexer (ROADM) controller.

11. The method of claim 1, wherein the management domain routing information comprises a border gateway protocol (BGP) community identification associated with a particular managed network services operation (MNSO) domain to which the customer equipment belongs, wherein the management domain routing information is configured to be forwarded to a managed network services router in the provider network for enable efficient routing of the management instructions from the particular MNSO domain via the out-of-band network and the secure tunnel connection.

12. A customer premises device comprising:

a memory configured to store day 0 configuration instructions;

a first network interface to couple to an out-of-band orchestration and management path;

a second network interface operatively coupled to a customer network; and at least one processor configured to automatically and without user input execute the day 0 configuration instructions to:

establish a secure tunnel connection with a security gateway device via the out-of-band orchestration and management path, wherein the security gateway device is operatively coupled to a provider network;

establish a connection with a configuration platform on the provider network via the secure tunnel connection;

receive orchestration instructions for configuring one or more virtual network functions (VNFs) from the configuration platform, wherein the orchestrations instructions are based on one or more customer configuration requests;

orchestrate the one or more VNFs based on the received orchestration instructions, wherein the one or more VNFs are configured to operate on the customer network via the second network interface that is different than the first network interface;

advertise management domain routing information to the security gateway device via the secure tunnel connection; and receive VNF management instructions from the security gateway device and via the secure tunnel connection based on the advertised management routing information, wherein the VNF management instructions include one of: updates, reconfigurations, or patches.

13. The customer premises device of claim 12, wherein the day 0 configuration instructions include at least one of a uniform resource locator (URL) or a network address associated with the security gateway device and a shared pre-shared key, and wherein the at least one processor to establish the secure tunnel connection is further configured to:

establish an Internet Protocol Security (IPSec) tunnel with the security gateway device based on the day 0 configuration instructions.

14. The customer premises device of claim 13, wherein the IPSec tunnel is persistently maintained or periodically recreated following orchestration of the one or more VNFs to receive the management instructions.

15. The customer premises device of claim 13, wherein the IPSec tunnel is recreated on demand by the customer premises device upon receipt of management instructions for the customer premises device at the security gateway device.

16. The customer premises device of claim 12, wherein the out-of-band orchestration and management path comprises a wireless network, and wherein the first network interface is configured to attach to the wireless network prior to establishing the secure tunnel connection.

17. The customer premises device of claim 12, further comprising:

a trusted platform module to generate, prior to delivery of the customer premises device to a customer, a key pair for authenticating and encrypting the customer premises device during configuration, and
wherein the at least one processor is further configured to:
automatically generate a certificate signing request (CSR) based on the key pair; transmit the CSR to the configuration platform via the secure tunnel connection;
receive a signed certificate from the configuration platform; and
establish the connection with configuration platform based on the signed certificate.

18. The customer premises device of claim 12, wherein the management domain routing information comprises a border gateway protocol (BGP) community identification associated with a particular managed network services operation (MNSO) domain to which the customer premises device belongs,
wherein the management domain routing information is configured to be forwarded to a managed network services router in the provider network for enable efficient routing of the management instructions from the particular MNSO domain via the out-of-band orchestration and management path and the secure tunnel connection.

19. A system for supporting zero touch provisioning of at least on virtual network function (VNF), comprising:
a customer premises device;
an out-of-band orchestration and management network;
a provider network;
a security gateway device operatively connected to each of the out-of-band orchestration and management network and the provider network;
a configuration platform operatively connected to the provider network;
a customer network different than the provider network; and
at least one management domain,
wherein the customer premises device is configured to automatically and without user input:
establish a secure tunnel connection with the security gateway device via the out-of-band orchestration and management network,
establish a connection with the configuration platform via the secure tunnel connection;
receive orchestration instructions for configuring one or more VNFs from the configuration platform, wherein the orchestrations instructions are based on one or more customer configuration requests;
orchestrate the one or more VNFs based on the received orchestration instructions, wherein the one or more VNFs are configured to operate on the customer network;
advertise management domain routing information to the at least one management domain via the security gateway device over the secure tunnel connection; and
receive VNF management instructions from the at least one management domain and via the security gateway device and the secure tunnel connection based on the advertised management routing information, wherein the VNF management instructions include one of:
updates, reconfigurations, or patches.

20. The system of claim 19, further comprising:
a managed network services router operatively coupled to the security gateway device and the at least one management domain on the provider network,
wherein the managed network services router is configured to implement a routing policy for delivering management instructions from the at least one management domain to the customer premises device.

* * * * *